Figure 1:
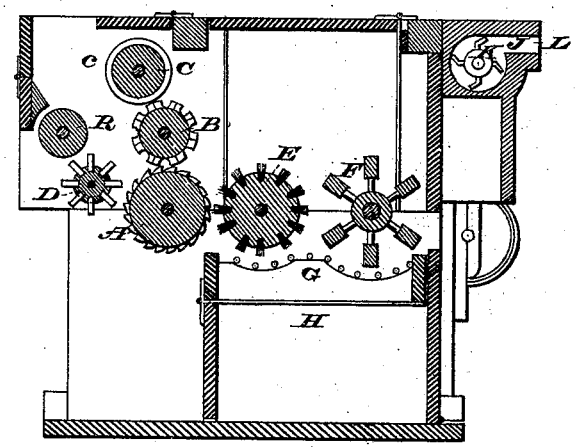

R. R. GWATHNEY.
Cotton-Separators.

No. 211,566. Patented Jan. 21, 1879.

Witnesses:
William Deering
H. A. Whittick

Inventor:
Richard R. Gwathney.

UNITED STATES PATENT OFFICE.

RICHARD R. GWATHNEY, OF LOUISVILLE, KENTUCKY.

IMPROVEMENT IN COTTON-SEPARATORS.

Specification forming part of Letters Patent No. 211,566, dated January 21, 1879; application filed April 29, 1878.

*To all whom it may concern:*

Be it known that I, RICHARD R. GWATHNEY, of Louisville, in the county of Jefferson and State of Kentucky, have invented and applied a new and useful Improvement to my Cotton Cleaner or Winnower, patented December 11, 1877, of which the following is a specification:

The purpose of my improvement is twofold: first, to effect an earlier separation of the bolls and trash, and, second, as much as possible to prevent the seed-cotton from forming itself into a roll, as it necessarily forms itself when undergoing a separation of the lint from the seed, as in an ordinary cotton-gin.

By referring to the drawings of my cotton-cleaner accompanying Patent No. 198,105, it will be seen that I have but one roller or agitator (marked D) at the bottom of the hopper, and a little in front of the cylinder, (marked A,) which separates the seed-cotton from the bolls and trash, as therein described. Under this reference it will be seen, also, that the retarding-cylinder B is made with pins and floats projecting spirally from its surface.

In the present improvement, in order to effect the twofold purpose as expressed above, I have supplied my winnower with an additional roller a little above and in front of the agitator D; and, secondly, I have changed the form of the cylinder B into floats inserted in sections, which, instead of spirally, run longitudinally, while between each pair of these sections I have inserted a ring or collar projecting more or less from the body of the cylinder, as may in practice be found advisable. This ring or collar is, however, not continous, but separated into segments with spaces between them, and with ends radial or more or less beveled, as experience may demonstrate to be preferable.

The additional roller, while in revolution outward, bearing on the upper surfaces of the stalks and trash, in conjunction with the cylinder D, while in similar revolution, bearing on the under surfaces of said stalks and trash, materially assists in the operation of throwing said stalks and trash out of the hopper, as desired, as under my first purpose, as hereinbefore expressed, while the change in the cylinder B, by its more broken or corrugated surface, gives it a recalcitrant character—that is, a kicking centrifugally—which effectually bars the formation of a roll in the hopper as the cotton with its seed rolls under the action of the gin-saws in an ordinary cotton-gin, and this throwing centrifugally I have discovered to be necessary to the easiest separation of the cotton with its seed from the worthless matter which may accompany it in a quick gathering of it in the cotton-field, and by this throwing centrifugally I have secured the accomplishment of my second purpose, as hereinbefore expressed.

Figure 2:
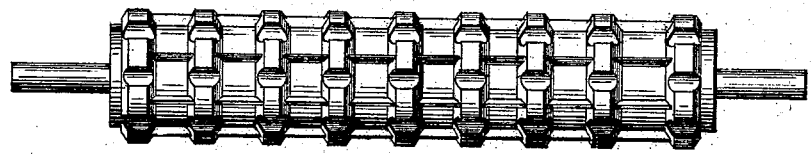
Figure 3:

In the accompanying drawings, Figure 1 is a sectional elevation of my machine made to correspond with Fig. 4 in my Patent No. 198,105. As in that drawing, so in this the revolving beater is indicated by the letter F, the fan-cylinder is indicated by E, the pin or saw cylinder by A, the retarding-cylinder by B, the upper retarding-cylinder by C, the agitating-cylinder by D, while by the letter R is designated the new or additional cylinder. Fig. 2 is a longitudinal drawing in elevation of the new or improved form of the retarding and recalcitrant cylinder B, while Fig. 3 is a cross-sectional view of the same, the fine radial lines showing cross-sections of the floats, and the outer circular lines showing the intermediate rings or collars separated into segments, as in the foregoing description. As, with the exception of the improvements hereinbefore described, the general purpose, construction, and operation of my winnower are given in my patent under the number aforesaid, it is deemed in this specification not necessary to repeat the same.

Having thus described my improvement, what I claim in this application, and desire to secure by Letters Patent, is—

1. The cylinder R, in combination with the cylinders D, A, and B, as and for the purpose as hereinbefore set forth.

2. The cylinder B, when made with its surface corrugated by broken or sectional longitudinal floats and segments of circles, as and for the purpose as hereinbefore set forth.

RICHARD R. GWATHNEY.

Witnesses:
WILLIAM DEERING,
H. A. WHITTICK.